(12) United States Patent
Kwon et al.

(10) Patent No.: US 8,861,624 B2
(45) Date of Patent: Oct. 14, 2014

(54) METHOD OF TRANSMITTING SIGNAL IN A WIRELESS SYSTEM

(75) Inventors: Yeong Hyeon Kwon, Gyeonggi-do (KR); Ja Ho Koo, Gyeonggi-do (KR); Jae Hoon Chung, Gyeonggi-do (KR); Dong Guk Lim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 271 days.

(21) Appl. No.: 13/143,479

(22) PCT Filed: Dec. 31, 2009

(86) PCT No.: PCT/KR2009/008007
§ 371 (c)(1),
(2), (4) Date: Jul. 6, 2011

(87) PCT Pub. No.: WO2010/082735
PCT Pub. Date: Jul. 22, 2010

(65) Prior Publication Data
US 2011/0305287 A1    Dec. 15, 2011

Related U.S. Application Data

(60) Provisional application No. 61/145,585, filed on Jan. 19, 2009.

(51) Int. Cl.
*H04L 27/28* (2006.01)
*H04L 5/00* (2006.01)
*H04L 25/02* (2006.01)
*H04W 56/00* (2009.01)

(52) U.S. Cl.
CPC ............. *H04L 5/0053* (2013.01); *H04L 25/023* (2013.01); *H04W 56/003* (2013.01); *H04L 5/0048* (2013.01); *H04L 5/0023* (2013.01); *H04L 5/0035* (2013.01)
USPC ............ 375/260; 375/259; 375/295; 375/219

(58) Field of Classification Search
CPC . H04B 7/0413; H04W 56/003; H04L 5/0053; H04L 25/023; H04L 5/0023; H04L 5/0035; H04L 5/0048
USPC .................. 375/260, 259, 295, 219
See application file for complete search history.

(56) References Cited

U.S. PATENT DOCUMENTS

| | | | |
|---|---|---|---|
| 6,347,120 B1 * | 2/2002 | Sakoda | 375/259 |
| 6,618,452 B1 | 9/2003 | Huber et al. | |
| 7,778,149 B1 * | 8/2010 | McGrath et al. | 370/208 |

(Continued)

FOREIGN PATENT DOCUMENTS

KR    10-0620455    8/2006

OTHER PUBLICATIONS

International Search Report for PCT/KR2009/008007 (PCT corresponding to present application).

*Primary Examiner* — Kenneth Lam
(74) *Attorney, Agent, or Firm* — Morgan, Lewis & Bockius LLP (57) ABSTRACT

A method of transmitting a signal of a mobile station that performs communication with a plurality of cells in a wireless communication system comprises transmitting a control signal or a data signal through an asynchronous channel to a neighboring cell which is not synchronized with the mobile station, the asynchronous channel including cyclic prefix and guard time.

8 Claims, 5 Drawing Sheets

(56) References Cited

U.S. PATENT DOCUMENTS

| | | | |
|---|---|---|---|
| 8,325,619 B2* | 12/2012 | Bourdeaut | 370/252 |
| 8,391,131 B2* | 3/2013 | Baldemair et al. | 370/208 |
| 2005/0030887 A1* | 2/2005 | Jacobsen et al. | 370/208 |
| 2005/0068922 A1* | 3/2005 | Jalali | 370/335 |
| 2007/0165696 A1* | 7/2007 | Agrawal | 375/136 |
| 2007/0165728 A1* | 7/2007 | Parizhsky et al. | 375/260 |
| 2008/0043858 A1 | 2/2008 | Lim et al. | |
| 2008/0095254 A1* | 4/2008 | Muharemovic et al. | 375/260 |
| 2008/0139214 A1* | 6/2008 | Sun et al. | 455/450 |
| 2008/0186880 A1* | 8/2008 | Seki et al. | 370/281 |
| 2008/0316961 A1* | 12/2008 | Bertrand et al. | 370/329 |
| 2009/0122731 A1* | 5/2009 | Montojo et al. | 370/280 |
| 2010/0113054 A1* | 5/2010 | Iwamura et al. | 455/452.1 |
| 2010/0158022 A1* | 6/2010 | Kliger et al. | 370/400 |
| 2011/0292824 A1* | 12/2011 | Uemura et al. | 370/252 |

* cited by examiner

METHOD OF TRANSMITTING SIGNAL IN A WIRELESS SYSTEM

The present application is a national stage of PCT International Application No. PCT/KR2009/008007 filed Dec. 31, 2009, and claims the benefit of U.S. Provisional Application No. 61/145,585, filed Jan. 19, 2009.

TECHNICAL FIELD

The present invention relates to a wireless communication system, and more particularly, to a method of transmitting a signal in a wireless communication system.

BACKGROUND ART

In a single cell environment, an asynchronous channel can be used if time synchronization is not decided. In a multi-cell environment, especially, if a mobile station transmits a signal a neighboring cell, time synchronization may not be decided. When a mobile station transfers a structural control signal of an action mode of a neighboring cell or interference related information under a multi-cell environment or transfers a control signal or data to a neighboring cell without through a serving cell under a coordinated multi-point (CoMP) environment, an asynchronous channel is used preferably. The mobile station may transmit a control signal or data if time synchronization is not decided. In this case, the mobile station may perform communication with a relay station and a femto station.

A main example of the asynchronous channel includes an uplink synchronization channel referred to as a random access channel or a ranging channel. The uplink synchronization channel is to measure transmission timing of uplink waves when the mobile station accesses a base station. The uplink synchronization channel is used during a basic procedure for receiving uplink resources after a mobile station accesses a base station. Accordingly, the uplink synchronization channel is used when the mobile station initially turns on the power within a serving channel or accesses the serving cell in a sleep mode or an idle mode, or when the mobile station performs handover to a neighboring cell.

The related art does not suggest an asynchronous channel in addition to an uplink synchronization channel. This is because that the related art is based on an operation of a single cell. However, in accordance with the advent of relay and CoMP, the mobile station has performed multi-cell operation with neighboring cells. Also, the mobile station may restrict a multi input multi output (MIMO) structure, which can be used in a neighboring cell, to reduce inter-cell interference, or may recommend the MIMO structure to improve receiving strength of a signal.

In case of the single cell operation, the serving cell may continue to perform timing tracking of the mobile station so as to adjust a timing error to a cyclic prefix (CP) length.

However, under the multi-cell environment, the mobile station may perform communication with a cell other than its serving cell. The mobile station may receive signals from multiple cells or feed the signals back to the multiple cells, or may transmit a signal to a neighboring cell to manage inter-cell interference. Also, a relay node may feed a signal back to a macro base station, or CoMP transmission and reception or handover may be performed. Moreover, the mobile station or unit base stations may transmit a control signal or data to another mobile station or base station.

However, even though cells share timing information by designating a series of timing advances under the multi-cell environment, the cells cannot maintain such timing information. For this reason, the timing advances should be measured continuously for correction by neighboring cells for continuous operation, or a synchronization process in view of a network should be performed separately so that the mobile station accesses the multiple cells without any problem.

DISCLOSURE OF INVENTION

Technical Problem

As described above, according to the related art, a problem occurs in that a synchronization process between a neighboring cell and a mobile station under a multi-cell environment is complicated.

Accordingly, the present invention has been devised to solve the aforementioned technical problem, and an object of the present invention is to provide a method of transmitting and receiving a control signal and a data signal efficiently to and from a mobile station and a neighboring cell.

It is to be understood that technical objects to be achieved by the present invention are not limited to the aforementioned technical object and other technical objects which are not mentioned will be apparent from the following description to the person with an ordinary skill in the art to which the present invention pertains.

Solution to Problem

To achieve the aforementioned object, in one aspect of the present invention, a method of transmitting a signal of a mobile station that performs communication with a plurality of cells in a wireless communication system comprises transmitting a control signal or a data signal through an asynchronous channel to a neighboring cell which is not synchronized with the mobile station, the asynchronous channel including cyclic prefix and guard time.

In this case, the cyclic prefix and guard time are defined in a unit of OFDM symbol.

Also, the asynchronous channel further includes a preamble.

Also, the asynchronous channel is distributed on a frequency axis.

Also, the asynchronous channel further includes a preamble region and a data region.

Also, the preamble is used for channel estimation of the data region, and includes information of the data region.

Also, the asynchronous channel further includes a data region.

To achieve the aforementioned object, in one aspect of the present invention, a method of transmitting a signal of a base station in a wireless communication system comprises transmitting a control signal or a data signal through an asynchronous channel to a mobile station which performs communication with a plurality of cells and is not synchronized with the base station, the asynchronous channel including cyclic prefix and guard time.

At this time, the cyclic prefix and guard time are defined in a unit of OFDM symbol.

Also, the base station transmits configuration information of the asynchronous channel to the mobile station.

Advantageous Effects of Invention

According to the embodiments of the present invention, the mobile station and the neighboring cell can efficiently transmit and receive a control signal and a data signal to and from each other by transmitting the signals through an asynchronous channel.

It is to be understood that the advantages that can be obtained by the present invention are not limited to the aforementioned advantages and other advantages which are not mentioned will be apparent from the following description to the person with an ordinary skill in the art to which the present invention pertains.

MODE FOR THE INVENTION

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. Hereinafter, the following detailed description includes detailed matters to provide full understanding of the present invention. However, it will be apparent to those skilled in the art that the present invention can be carried out without the detailed matters. For example, although the following description will be made based on that a mobile communication system is a 3GPP LTE system, the following description can be applied to another random mobile communication system excluding particular features of 3GPP LTE.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

Moreover, in the following description, it is assumed that a mobile station will refer to a user equipment (UE), or a mobile or fixed type user terminal device. Also, it is assumed that a base station will refer to a random node of a network terminal that performs communication with a mobile station, such as Node B and eNode B.

A method of transmitting an asynchronous channel of a mobile station which is performing communication with a plurality of cells in a wireless communication system according to the embodiment of the present invention will be described with reference to the accompanying drawings.

In the method of transmitting an asynchronous channel according to the embodiment of the present invention, a method of using a random access channel corresponding to an asynchronous channel of the related art and a method of configuring a new asynchronous channel will be described.

First of all, a method of transmitting an asynchronous channel according to the first embodiment of the present invention will be described.

According to the first embodiment of the present invention, a mobile station transmits data or a control signal to a neighboring cell through a random access channel corresponding to an asynchronous channel of the related art.

The random access channel is supported by most of cellular systems and used to estimate uplink timing of the mobile station during system entry or neighboring cell entry. Generally, a base station notifies the mobile station of configuration of the random access channel through a broadcast channel while the mobile station selects a random one of sequences that can be used in the random access channel and transmits the selected sequence to the base station.

Examples of another method of using the random access channel include a method of using a part of sequences of a random channel access according to the related art and a method of using a sequence of a new random access channel. Whatever any one of the above two methods is selected, examples of resources that can be used include sequence information that can be used within random access, and time and frequency range where the random access channel is transferred.

In order that the mobile station transmits a control signal or data to the neighboring channel using the random access channel, the mobile station should know index of a preamble sequence set of the neighboring cell. In the LTE system, the preamble sequence set of the random access channel includes 64 indexes. The embodiment of the present invention suggests four methods of notifying a mobile station of index of a preamble sequence set of a neighboring cell.

According to the first method, neighboring cells cooperative with a CoMP mode transfer a preamble sequence set of a random access channel and RACH configuration to a serving cell of a corresponding mobile station through an interface (for example, X2 interface, radio interface, or other transfer mode between base stations) defined between base stations. Then, the serving cell transfers the preamble sequence and RACH configuration to the corresponding mobile station through upper layer signaling or L1/L2 control signaling. The upper layer signaling could be mobile station RRC signaling, and the L1/L2 control signaling may be defined by a field of a DCI format of a physical downlink control channel (PDCCH) for starting CoMP.

According to the second method, the corresponding mobile station decodes a physical broadcast channel (PBCH) of a corresponding cell and a physical downlink shared channel (PDSCH) through which system information (SIB-2) is transmitted, by performing neighboring cell search for neighboring cells cooperative with the CoMP mode, whereby preamble sequence set information of a random access channel within the system information can be obtained.

According to the third method, neighboring cells cooperative with a CoMP mode transfer a random dedicated preamble to be used by a corresponding mobile station and RACH configuration to a serving cell of the corresponding mobile station through an interface (for example, X2 interface, radio interface, or other transfer mode between base stations) defined between base stations. Then, the serving cell transfers the random dedicated preamble and RACH configuration to the corresponding mobile station through upper layer signaling or L1/L2 control signaling, and the corresponding mobile station transmits the preamble to the corresponding neighboring cell.

According to the fourth method, neighboring cells cooperative with a CoMP mode transfer a plurality of dedicated preamble sets to be used by a corresponding mobile station and RACH configuration to a serving cell of the corresponding mobile station through an interface (for example, X2 interface, radio interface, or other transfer mode between base stations) defined between base stations. Then, the serving cell transfers the plurality of dedicated preamble sets and RACH configuration to the corresponding mobile station through upper layer signaling or L1/L2 control signaling, and the corresponding mobile station selects a random index of the dedicated preamble sets and transmits a preamble corresponding to the selected index to the corresponding neighboring cell.

First of all, a case where the mobile station transmits a precoding matrix index to a neighboring cell using a random access channel will be described. The mobile station may request the neighboring cell to use or not to use a specific precoding matrix, thereby reducing inter-cell interference. In this case, the mobile station should transmit an index of a precoding matrix, which is requested to be used or not to be used, to the neighboring cell.

In the first embodiment of the present invention, a preamble sequence of the random access channel is mapped with a precoding matrix index, and the mobile station transmits the preamble sequence of the random access channel to the neighboring cell, wherein the preamble sequence of the random access channel is mapped with the precoding matrix index requested to be used or not to be used by the neighboring cell.

Figure 1:
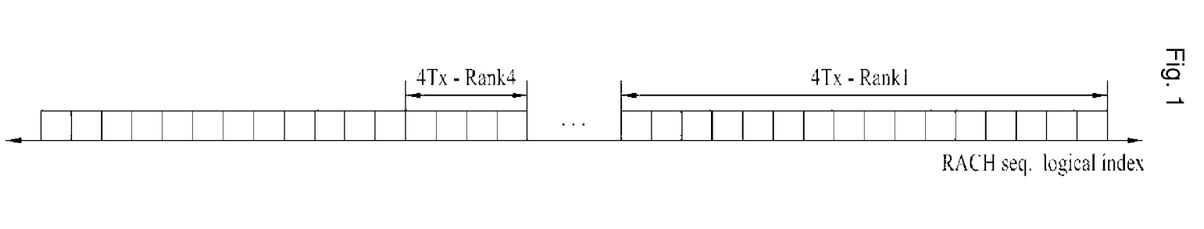
FIG. 1 is a diagram illustrating an example that a precoding matrix index is mapped with a preamble sequence of a random access channel in accordance with the first embodiment of the present invention.

FIG. 1 is a diagram illustrating an example that a precoding matrix index is mapped with a preamble sequence of a random access channel.

The preamble sequence of the random access channel can be mapped with the precoding matrix index at a ratio of 1:1 or 1:n. If the preamble sequence of the random access channel is mapped with the precoding matrix index at a ratio of 1:1, it means that one preamble sequence is mapped with one precoding matrix index. If the preamble sequence of the random access channel is mapped with the precoding matrix index at a ratio of 1:n, it means that one preamble sequence is mapped with a precoding matrix index subset or one precoding matrix index is mapped with a plurality of preamble sequences. If one precoding index is mapped with several preambles, it is easy to identify request strength of a peripheral mobile station. On the other hand, if several precoding indexes are mapped with one preamble index or its set, precoding indexes representing similar features are regarded as one precoding index. In this case, a decrease effect of signaling information occurs. This is similar to a case where a large number of precoding indexes are defined as a small number of precoding indexes.

Since the precoding matrix index has various ranks depending on a MIMO mode, all of precoding matrix indexes per rank may be mapped with the preamble sequence, or only a precoding matrix index of a specific rank may be mapped with the preamble sequence. Since the number of precoding matrix indexes which are actually used may be varied depending on the number of antennas of the base station, only a part of the precoding matrix indexes may be mapped with the preamble sequence depending on ranks.

At this time, the index of the preamble sequence mapped with the precoding matrix matrixes can be used regardless of a specific order. However, if an index of a specific preamble sequence is significant, it may be selected otherwise. For example, in case of the 3GPP LTE, preamble sets other than dedicated preamble sets among a total of 64 preamble sequences can be divided into sets defining a low buffer status and sets defining a high buffer status. In this case, the index of the preamble sequence to be mapped with the precoding matrix index can be selected in accordance with the buffer status. For example, the same number of preamble sequences may be selected from the low buffer and the high buffer. The number of preambles to be associated with precoding may be selected differently among preambles for the low buffer status and the high buffer status. Also, all preamble sequences may be selected from the low buffer or the high buffer.

Furthermore, the preamble sequence mapped with the precoding matrix index may be selected over several random access channels. In this case, index mapping is performed depending on time and frequency. For example, mapping may be performed for only the precoding matrix indexes corresponding to a specific rank at a specific time. Also, preamble sequences may be selected uniformly from the respective random access channels, whereby the selected preamble sequences may be mapped with the precoding matrix indexes that can be selected by the mobile station of the neighboring cell, at a ratio of 1:1 or 1:n.

If the mobile station interferes with the neighboring cell, it may select one or more precoding matrixes more interfering with itself or less interfering with itself. Then, the mobile station transmits a preamble sequence corresponding to the index of the selected precoding matrix to the neighboring cell. If the mobile station transmits the preamble sequence corresponding to the precoding matrix requested to be used, the neighboring cell gives priority to use of the precoding matrix corresponding to the received preamble sequence. If the mobile station transmits the preamble sequence corresponding to the precoding matrix requested not to be used, the neighboring cell gives priority to non-use of the precoding matrix corresponding to the received preamble sequence.

Hereinafter, a case where the mobile station transmits acknowledgement/non-acknowledgement (ACK/NACK) to the neighboring cell using the random access channel will be described.

If the mobile station receives same packets through beamforming or performs the operation related to multiple cells, such as a spatial multiplexing mode or a spatial diversity mode, it should transmit control information to the multiple cells. At this time, after transmitting and receiving ACK/NACK to and from the serving cell, the mobile station should notify the neighboring cells that the serving cell has successfully transferred the corresponding packets to the neighboring cells by finishing processing. In this case, if latency time is long, latency of a downlink HARQ process increases. Accordingly, the mobile station can directly transmit ACK/NACK to the neighboring cell to reduce latency of the downlink HARQ process.

In the first embodiment of the present invention, the mobile station transmits ACK/NACK to the neighboring cell through the random access channel.

After receiving the packets, the mobile station can transmit ACK/NACK of the packets to the neighboring cell through the random access channel within a given time. At this time, the mobile station can transmit ACK/NACK to the neighboring cell by using a specific preamble sequence designated from the neighboring cell.

If the mobile station transmits ACK, it transmits a specific sequence to the neighboring cell. If the mobile station transmits NACK, it may not transmit anything or allocate different random access sequences for ACK and NACK. Also, the mobile station may transmit additional preamble sequence, which can be used as a reference symbol, and a signal having combined ACK/NACK information, at the same time.

As described above, in order to transmit information to the base station using the preamble sequence of the random access channel, the mobile station should identify how corresponding information is mapped with the preamble sequence.

In case of the precoding matrix index, the base station needs to notify the mobile station as to how the precoding matrix index is associated with the preamble sequence for a precoding matrix index structure that can be allowed for the specific precoding matrix index.

To this end, the most direct method is that the base station notifies the mobile station of a channel structure for transmitting a corresponding preamble index and a preamble and an indicator for a specific precoding matrix index set.

To simplify such a method, for the precoding matrix index set, indexing of a specific mode may be defined separately, or a structure of a precoding matrix index to be used may be defined. For the preamble sequence, an index range may be notified, and a start position may be defined previously to identify the index of the preamble sequence to be used by using the number of preamble sequences to be used. At this time, the index of the preamble sequence can be determined in such a manner that logical index increases or decreases from the start position. For example, among a total of preambles of the random access channel, starting from logical index 0 or the last logical index, the logical indexes can be mapped with the number of preamble sequences required for the number of precoding matrix index sets or precoding matrix indexes to be mapped.

If the number of preamble sequences which are used corresponds to the preamble sequences within the random access channel, it is preferable to designate start and end of the dedicated preamble sequence. However, mapping may be performed based on start and end of the preamble sequence used for initial access.

If the mobile station transmits ACK/NACK, the preamble sequence is used depending on the number of ACKs/NACKs. If one preamble sequence is needed, the base station can directly notify the mobile station of the corresponding index. If two or more preamble sequences are needed, the base station can notify the mobile station of indexes of the preamble sequence by listing them, or can notify the mobile station of the start position only. Then, the mobile station can determine the indexes of the preamble sequence by automatically increasing or decreasing the number of preamble sequences from the start position. If the mobile station can identify the number of ACKs/NACKs, the base station only needs to notify the mobile station of index of the preamble sequence corresponding to the start position.

The aforementioned addressing method can be used as the method of notifying the index of the preamble sequence of the necessary random access channel even in the case that other information, such as rank indicator (RI) and channel quality indicator (CQI), as well as ACK/NACK, is transferred.

Next, a method of transmitting an asynchronous channel in accordance with the second embodiment of the present invention will be described.

In the second embodiment of the present invention, the mobile station configures a new asynchronous channel and transmits data or a control signal to the neighboring cell through the new asynchronous channel.

The new asynchronous channel generated in accordance with the second embodiment of the present invention will be described with reference to FIG. 2 to FIG. 5.

If the neighboring cell is very small such as relay or femto cell, since very small path loss and very small round trip delay occur, more efficient channel structure can be used. In this respect, in the second embodiment of the present invention, if the neighboring cell is relay or femto cell, the mobile station configures an asynchronous channel easy to access the neighboring cell.

A structure of the asynchronous channel is varied depending on a size of a cell, a level of path loss, which is to be set, whether a signal is transmitted using a sequence or data information, etc.

Figure 2:
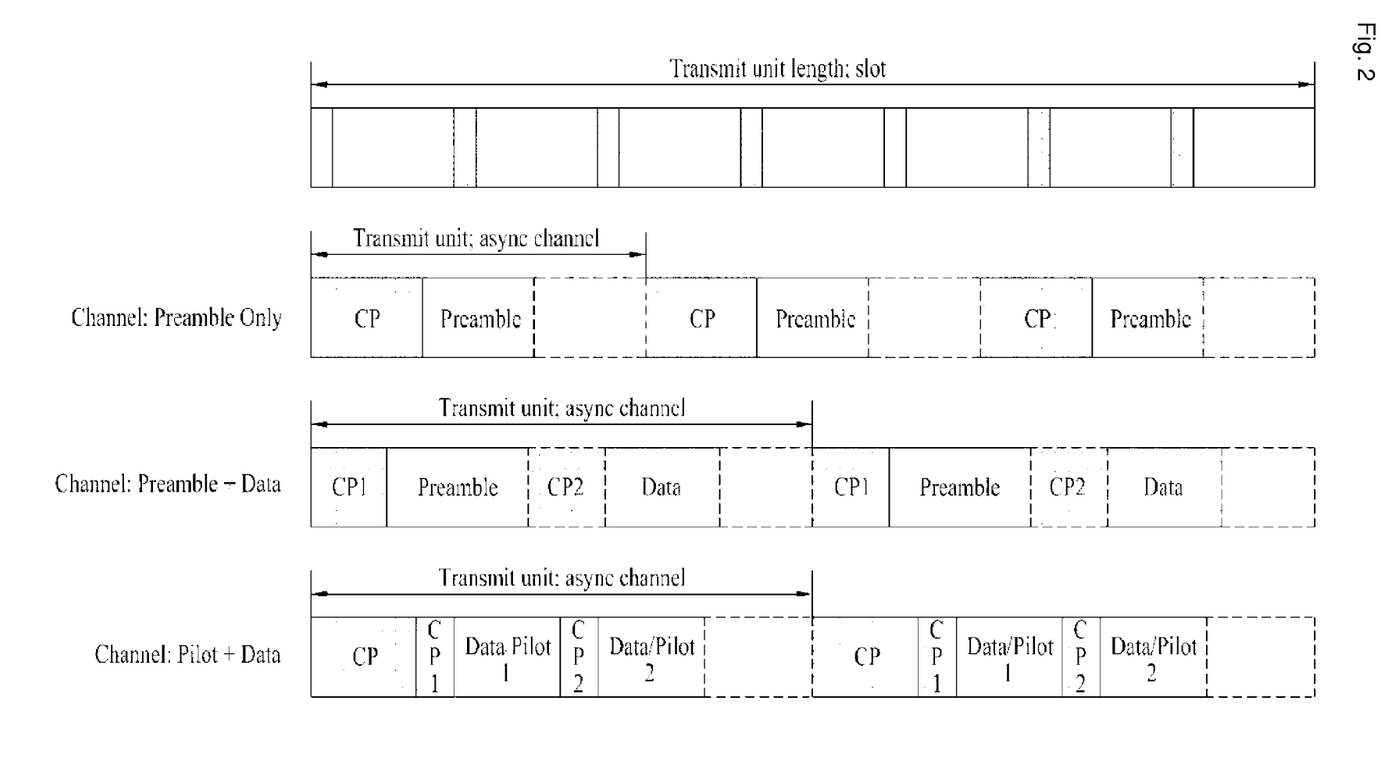
FIG. 2 is a diagram illustrating asynchronous channels generated in accordance with the second embodiment of the present invention.

FIG. 2 is a diagram illustrating a structure of asynchronous channels generated in accordance with the second embodiment of the present invention.

FIG. 2 illustrates an example of an asynchronous channel for one transmission unit. In FIG. 2, although a slot has been used as an example of a transmission unit, a transmission time interval (TTI) may be used.

As shown in FIG. 2, the asynchronous channel can be generated by a structure for transmitting a preamble only, a structure for transmitting preamble and data, or a structure for transmitting pilot and data. In FIG. 2, although the structure for transmitting preamble and data illustrates a structure for transmitting data after transmitting preamble, the order of preamble and data may be changed.

In FIG. 2, a dotted line represents a guard time. The guard time is required not to cause interference between neighboring channels. One transmission unit length can be varied, and a signal part within one transmission unit may be segmented into more parts or less parts. The guard time may not be required if the CP length is sufficiently long.

Figure 3:
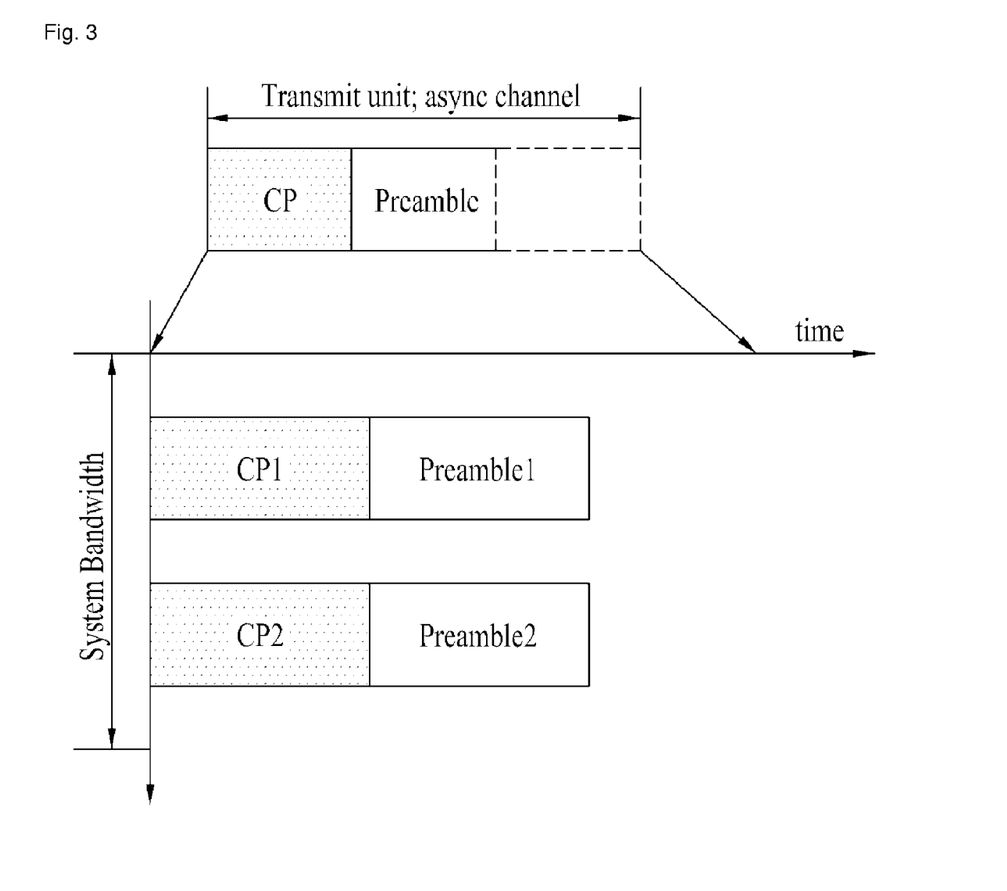
FIG. 3 is a diagram illustrating a structure of an asynchronous channel through which only a preamble is transmitted in accordance with the second embodiment of the present invention.

FIG. 3 is a diagram illustrating a structure of an asynchronous channel through which only a preamble is transmitted in accordance with the second embodiment of the present invention.

Although an asynchronous channel through which only a preamble is transmitted may suppose localized resource allocation such as a random access channel according to the related art, the asynchronous channel may suppose distributed resource allocation or localized resource allocation depending on use.

For example, as shown in FIG. 3, a resource region may be divided into two or more on a frequency axis, whereby each resource region may be set as one preamble transmission region. Alternatively, all the resource regions may be set as one preamble transmission region.

If each resource region is set as one preamble transmission region, each resource region can be configured as an independent channel. In this case, it is preferable that the preamble transmitted from each resource region has low cross correlation and low autocorrelation within each region.

Also, each resource region can be used to transfer different kinds of information. Namely, the first frequency region is used to transmit information A while the second frequency region is used to transmit information B.

An independent sequence set may be defined for each resource region and sequences transmitted from each region may be combined. The asynchronous channel may be configured by defining spreading sequence or scrambling sequence together with the sequences transmitted from each region.

Cyclic prefix and guard time can be set depending on a permissible range of asynchronous access. For example, although cyclic prefix and guard time should be set depending on all regions covered by a cell in the existing commercial network such as a macro cell, they may be set at a very small length in case of a relay or femto cell. Namely, cyclic prefix may be set at a length equivalent to data cyclic prefix of the related art, or may be set at a length smaller than that of data cyclic prefix of the related art.

Although a preamble occurs on a time axis one time in FIG. 3, the preamble may be extended more than once. In this case, the preamble can be configured in a continuous type, an insertion type of short cyclic prefix prior to each preamble, and an insertion type of long cyclic prefix prior to each preamble.

Figure 4:
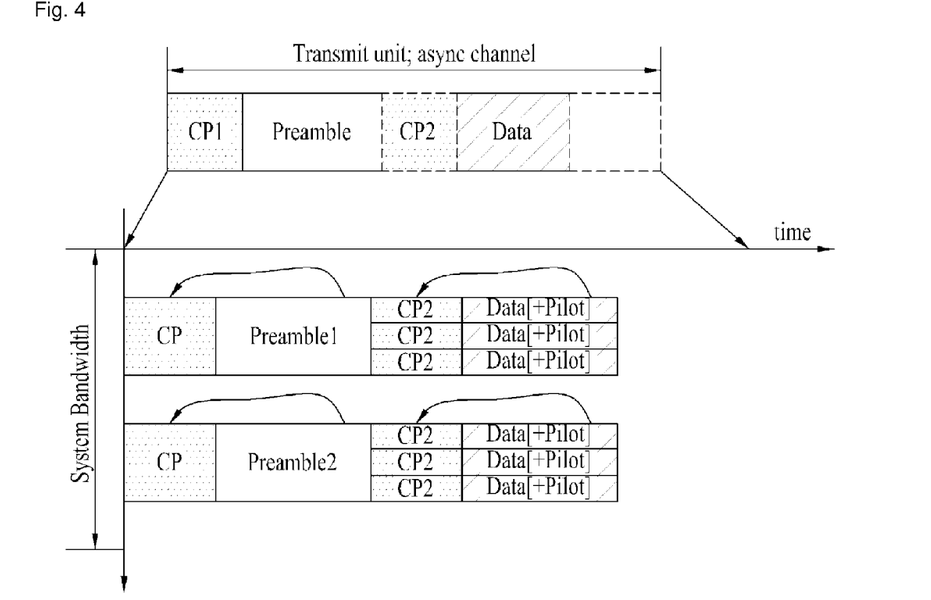
FIG. 4 is a diagram illustrating a structure of an asynchronous channel through which preamble and data are transmitted in accordance with the second embodiment of the present invention.

FIG. 4 is a diagram illustrating a structure of an asynchronous channel through which preamble and data are transmitted in accordance with the second embodiment of the present invention.

An asynchronous channel through which preamble and data transmitted may be allocated in a distributed resource allocation type or a localized resource allocation type on a frequency axis.

At this time, as an additional method for dividing resources, as shown in FIG. 4, a frequency domain where one preamble sequence is defined is subdivided into several frequency domains for transmitting data information. The resources of this data region can be divided into a distributed resource allocation type or a localized resource allocation type within the frequency domain where one preamble sequence is defined. The frequency resources divided as above may allow data transmission in such a manner that one block is selected during data transmission. Alternatively, the frequency resources may allow data transmission in a distributed resource allocation type.

The preamble may be defined independently in one frequency domain, or one sequence may be defined for a plurality of frequency domains, or sequences of a plurality of independent frequency domains may be used in combination. Also, spreading sequence or scrambling sequence may additionally be added to the frequency domain so as to transmit a data signal or control signal.

The base station which has received the asynchronous channel of FIG. 4 can perform channel estimation of a data region using the preamble. If it is not easy to perform channel estimation using the preamble, the base station may perform channel estimation using additional pilot symbols of the frequency domain where data are transmitted, by obtaining information of the frequency domain where data are transmitted, using the preamble. Accordingly, if the preamble does not become a channel reference of the data region, the data region should include additional pilot symbols.

If additional pilot symbols are not included in the data region, a frequency domain of the data region can be reconfigured in a distributed resource allocation type or localized resource allocation type by either a structure different from the frequency domain where preamble is allocated or combination with the frequency domain.

The number of preamble regions and the number of data regions included in one transmission unit may be different from each other. Namely, although one preamble region and one data region are included in one transmission unit in FIG. 4, two preamble regions and one data region may be included in one transmission unit, or one preamble region and two data regions may be included in one transmission unit. In this way, various modifications can be made in the number of preamble regions and the number of data regions included in one transmission unit. If a transmission unit is long, combination of more various preamble regions and more various data regions can be obtained.

Figure 5:
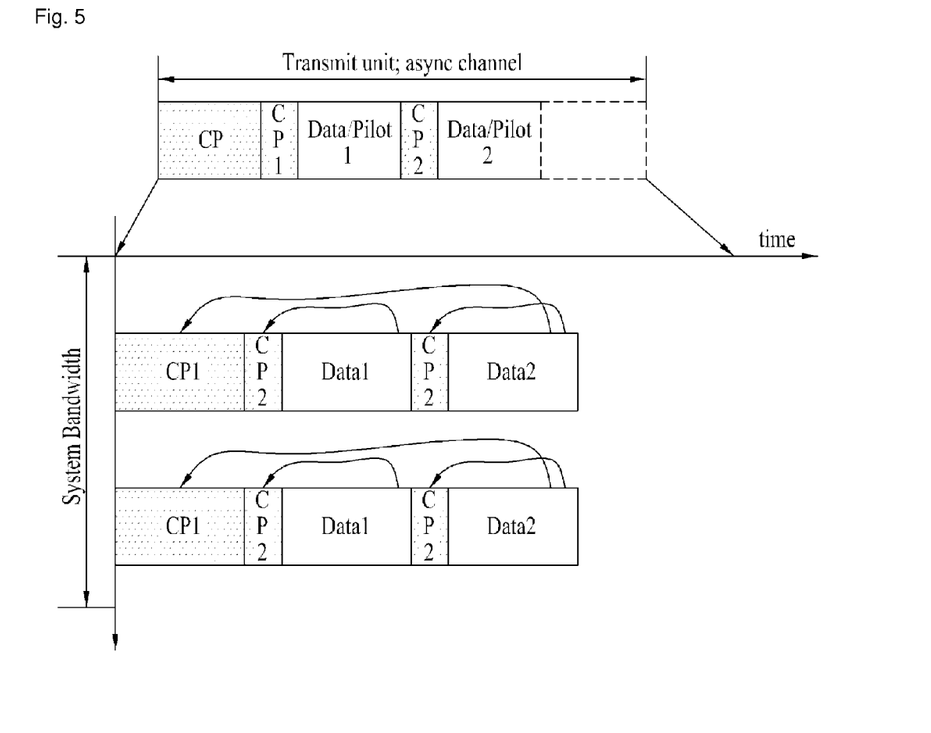
FIG. 5 is a diagram illustrating a structure of an asynchronous channel through which pilot and data are transmitted in accordance with the second embodiment of the present invention.

FIG. 5 is a diagram illustrating a structure of an asynchronous channel through which pilot and data are transmitted in accordance with the second embodiment of the present invention.

As shown in FIG. 5, the mobile station inserts cyclic prefix to each of data packets and also inserts cyclic prefix of all transmission blocks that include a plurality of data packets. Namely, in FIG. 5, CP1 represents cyclic prefix of all transmission blocks while CP2 represents cyclic prefix of each of data blocks included in all the transmission blocks. In this case, CP1 can be used to solve ambiguousness of the asynchronous channel, and CP2 can be used to process inter-symbol interference due to delay spread in a processing unit.

In FIG. 5, the domain where data and pilot are transmitted may be allocated on the frequency axis in accordance with a distributed resource allocation or localized resource allocation.

In case of localized resource allocation, the mobile station has an advantage such low cubic metric whereas it may have a difficulty in obtaining frequency diversity. On the other hand, in case of distributed resource allocation, the mobile station can obtain frequency diversity but has a difficulty in obtaining low cubic metric. To solve this, in case of distributed resource allocation, the frequency domain used as the data region can be set at equivalent intervals. Also, CM/PAPR features can be improved through masking sequence for each frequency domain.

If one transmission unit includes a plurality of data transmission regions, the frequency domain can be set by hopping the plurality of data transmission regions. Then, low CM/PAPR features and frequency diversity can be obtained simultaneously. Although FIG. 5 illustrates that two data regions are included in one transmission unit, the number of data regions included in one transmission unit may increase or decrease depending on the method of configuring an asynchronous channel and a length of a transmission unit.

The asynchronous channels of FIG. 3 to FIG. 5 may have a single carrier type modulation such as SC-FDM or multi-carrier type modulation such as OFDM. The data region may include pilot symbols, or the entire of the data region may be used as pilot. A specific data region may be set as a blanking region where data are not transmitted. Also, if several information parts are repeated within one transmission unit as the case may be, spreading sequence may be applied. If different information parts are included in one transmission unit, scrambling sequence may be applied between the different information parts.

A method of reporting a configuration of a subframe, which includes a preamble transmission unit suggested as above, from a cell to a mobile station within the cell will be described.

The cell can transmit configuration of subframes that include an asynchronous channel transmission unit to all mobile stations within the cell or a mobile station or mobile station group that enables CoMP, through upper layer signaling, cell common PDCCH or group common PDCCH by using a bitmap or a random compression method as system information (SIB-2 or random SIB class or random LTE-A dedicated SIB class). In the case that the asynchronous channel suggested as above is limited to mobile stations to which CoMP is applied, the cell can transmit configuration information (if table is previously determined, random configuration index within the table) related to transmission of the asynchronous channel to the mobile stations through cell common upper layer signaling or PDCCH. Also, the cell can transmit the configuration information to each mobile station through mobile station RRC signaling or mobile specific PDCCH.

The mobile station can access its neighboring cell using the asynchronous channels of FIG. 3 to FIG. 5, or the neighboring cell can transfer a signal to the mobile station. If the mobile station transfers a signal to the base station, information that can be transferred may be varied depending on the configuration of the asynchronous channel. For information transfer, preamble index may be used or data region may be used. If the preamble index is used, the mobile station can transfer the preamble index to the base station by mapping the preamble index with information index.

If the preamble index is used, the mobile station can transfer all kinds of information expressed by index to the base station. Examples of information expressed by index include precoding matrix index, MCS, CQI, simple control information such as ACK/NACK, rank information, and power control index.

If the data region is used, the mobile station can transfer more various values as well as information expressed by index to the base station. For example, examples of the values include channel status information, beamforming vector, data traffic, physical control message, femto-cell operational parameters, and CoMP transmission and reception information.

The asynchronous channels of FIG. 3 to FIG. 5 can be used at the basic operation of CoMP. For example, if several cells transmit a signal to one mobile station at the same time, since the corresponding mobile station is not likely to be synchronized with each base station, long cyclic prefix is required for synchronization. Accordingly, when several cells transmit a signal to one mobile station at the same time, the asynchronous channels of FIG. 3 to FIG. 5 can be used. Also, when the mobile station transmits a signal to its neighboring cell which is not synchronized with the base station, the asynchronous channels of FIG. 3 to FIG. 5 can be used.

Figure 6:
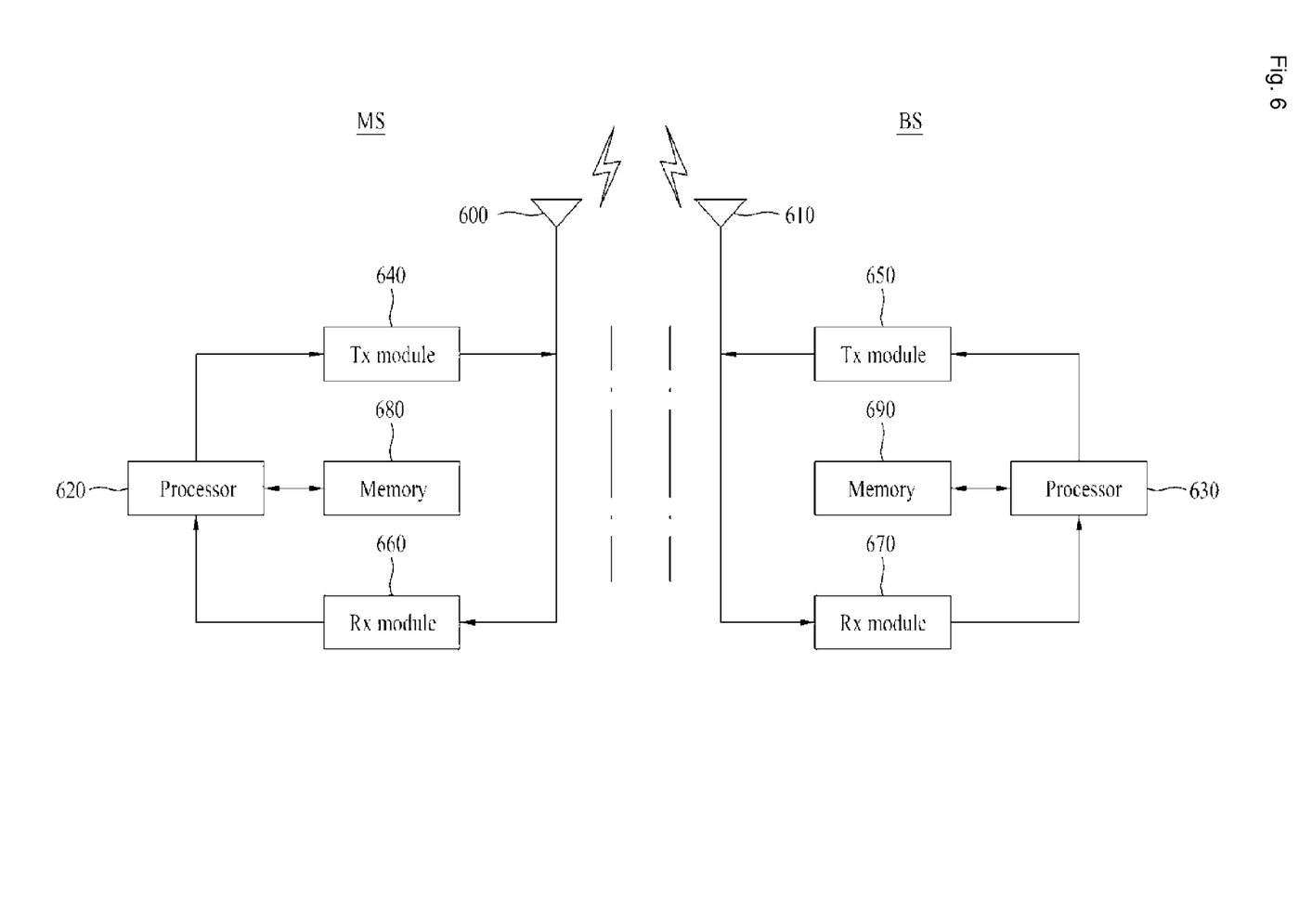
FIG. 6 is a diagram illustrating a configuration of a mobile station and a base station, in which the embodiments of the present invention can be implemented, in accordance with another embodiment of the present invention.

FIG. 6 is a diagram illustrating a configuration of a mobile station and a base station, in which the embodiments of the present invention can be implemented, in accordance with another embodiment of the present invention.

Each of the mobile station (AMS) and the base station (ABS) includes an antenna 100, 610 transmitting and receiving information, data, signal and/or message, a Tx module 640, 650 transmitting a message by controlling the antenna, an Rx module 660, 670 receiving a message by controlling the antenna, a memory 680, 690 storing information related to communication with the base station, and a processor 620, 630 controlling the Tx module, the Rx module, and the memory. At this time, the base station could be the femto base station or the macro base station.

The antenna 600, 610 serves to transmit a signal generated by the Tx module 640, 650 to the outside or receive a radio signal from the outside to transfer the radio signal to the Rx module 660, 670. If a MIMO antenna function is supported, two or more antennas may be provided.

The processor 620, 630 generally controls the whole operation of the mobile station or the base station. Particularly, the processor 20, 30 can perform a controller function for performing the aforementioned embodiments of the present invention, a medium access control (MAC) frame variable control function according to service characteristics and radio wave condition, a handover function, an authentication and encryption function, etc. Also, the processor 620, 630 further includes an encryption module for controlling encryption of various messages and a timer module controlling transmission and reception of various messages.

The Tx module 640, 650 performs predetermined coding and modulation for signal and/or data, which are scheduled from the processor 20, 30 and then transmitted to the outside, and then transfers the coded and modulated data to the antenna 600, 610.

The Rx module 660, 670 performs decoding and demodulation for the radio signal received from the outside through the antenna 600, 610 to recover original data and then transfer the recovered data to the processor 620, 630.

The memory 680, 690 may store a program for processing and control of the processor 620, 630, or may perform a function for temporarily storing input/output data (in case of the mobile station, UL grant allocated from the base station, system information, station identifier (STID), flow identifier (FID), action time, zone allocation information, and frame offset information).

Also, the memory 680, 690 can include at least one type of a flash memory type, a hard disk type, a multimedia card micro type, a card type memory (for example, SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

The invention claimed is:

1. A method of transmitting a signal of a mobile station that performs communication with a plurality of cells in a wireless communication system, the method comprising:
   transmitting a preamble and data through an asynchronous channel to a neighboring cell which is not synchronized with the mobile station,
   wherein a structure of the asynchronous channel includes a preamble region for the preamble and a plurality of data regions for the data,
   wherein the structure of the asynchronous channel further includes a first cyclic prefix for all of the preamble region and the plurality of data regions to solve ambiguousness of the asynchronous channel,
   wherein each of the plurality of data regions includes a second cyclic prefix for corresponding data to process inter-symbol interference,
   wherein the first cyclic prefix is generated by using a last data region among the plurality of data regions, and
   wherein the second cyclic prefix is generated by using a corresponding data region.

2. The method of claim 1, wherein the first cyclic prefix and the second cyclic prefix are defined in a unit of OFDM symbol.

3. The method of claim 1, wherein the asynchronous channel is distributed on a frequency axis.

4. The method of claim 1, wherein the preamble is used for channel estimation of the plurality of data regions, and includes information of the plurality of data regions.

5. The method of claim 1, wherein:
the preamble is used for obtaining synchronization with the neighboring cell; and
each of the plurality of data regions includes a pilot for channel estimation of the corresponding data region.

6. The method of claim 1, wherein the preamble indicates control information of the neighboring cell, the control information including one at least of a precoding matrix index, ACK/NACK (Acknowledgement/Negative Ack) response, a rank indicator (RI) and a channel quality indicator (CQI).

7. The method of claim 6, wherein information on a relation between the preamble and the control information of the neighboring cell is transferred from the neighboring cell to a serving cell via X2 interface.

8. The method of claim 7, wherein the information on the relation is transmitted from the serving cell to the mobile station.

* * * * *